T. J. FEGLEY & G. O. LEOPOLD.
VISE.
APPLICATION FILED JULY 30, 1917.
1,269,271.
Patented June 11, 1918.
2 SHEETS—SHEET 2.
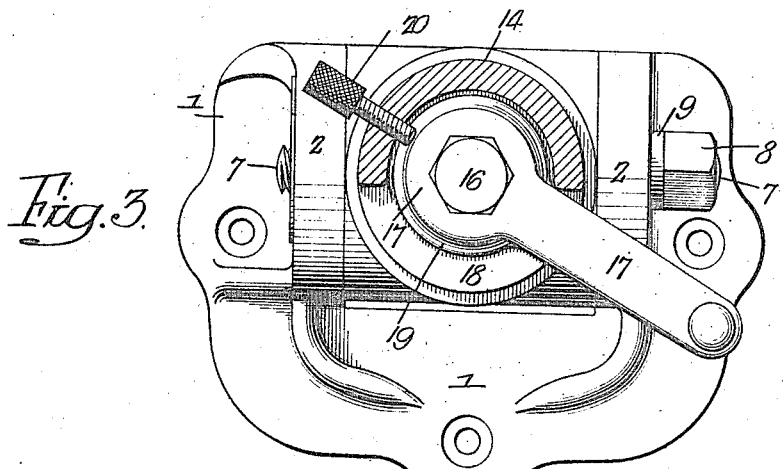
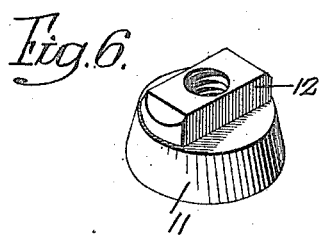
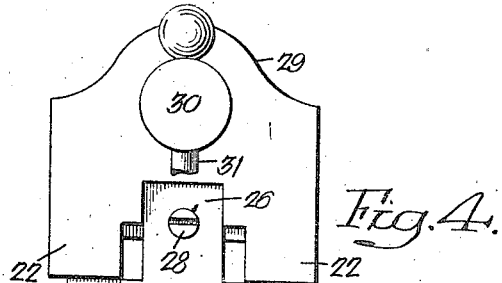
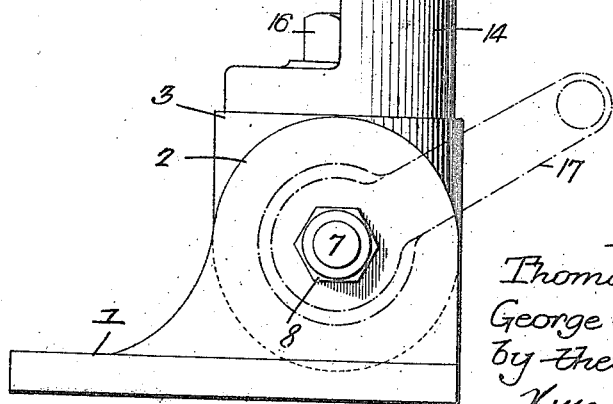
Inventors—
Thomas J. Fegley,
George O. Leopold.
by their Attorneys

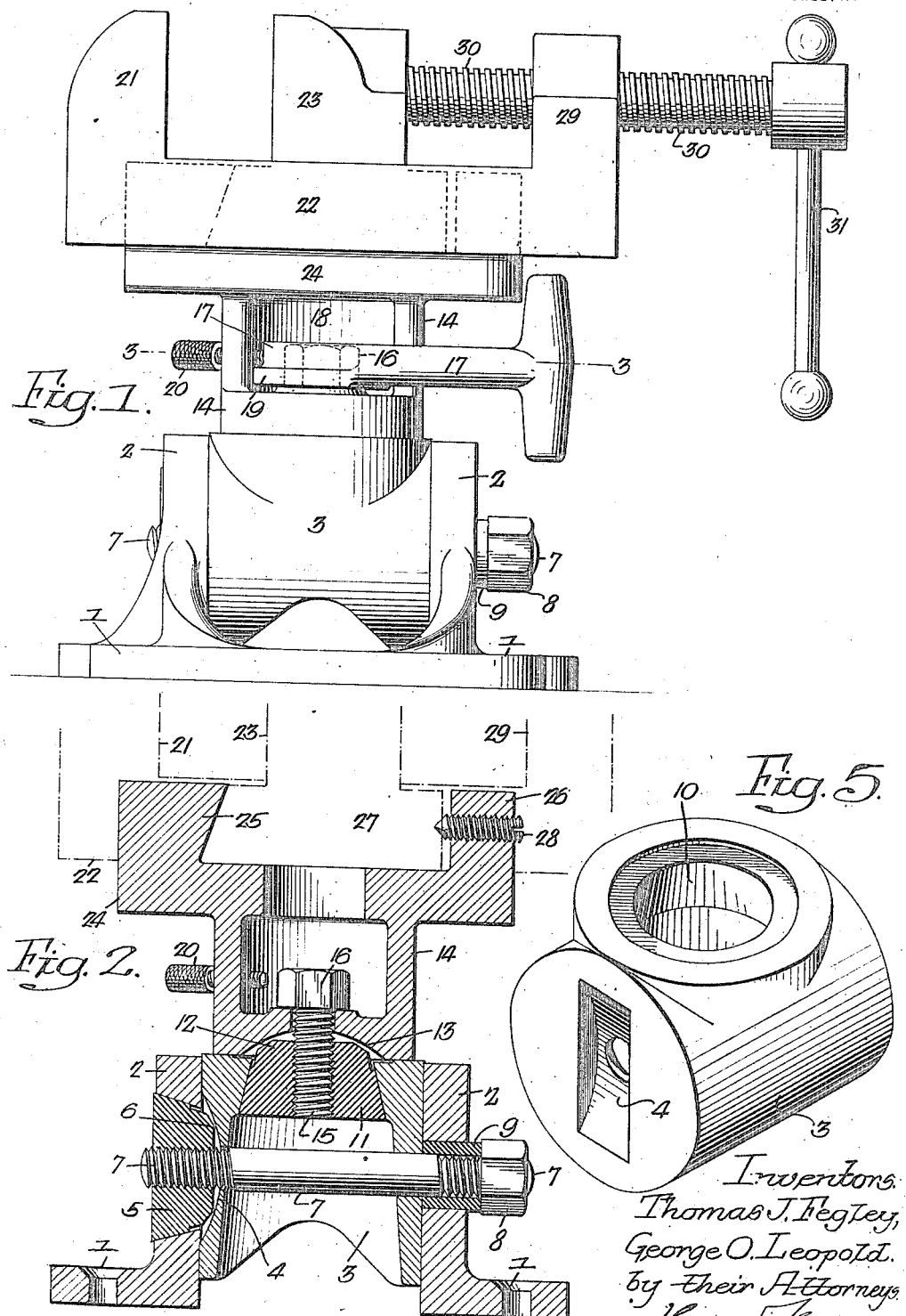

UNITED STATES PATENT OFFICE.

THOMAS J. FEGLEY AND GEORGE O. LEOPOLD, OF PHILADELPHIA, PENNSYLVANIA, ASSIGNORS TO NORTH BRO'S M'F'G CO., OF PHILADELPHIA, PENNSYLVANIA, A CORPORATION OF PENNSYLVANIA.

VISE.

1,269,271.　　　　　Specification of Letters Patent.　　Patented June 11, 1918.

Application filed July 30, 1917. Serial No. 183,548.

*To all whom it may concern:*

Be it known that we, THOMAS J. FEGLEY and GEORGE O. LEOPOLD, citizens of the United States, and residents of Philadelphia, county of Philadelphia, State of Pennsylvania, have invented certain Improvements in Vises, of which the following is a specification.

Our invention relates to certain improvements in bench vises of the type capable of being turned on a vertical pivot, or turned so that the jaws of the vise will assume a position at an angle to the base.

One object of our invention is to provide a simple and effective coupling between the base of the vise and the body portion so that the body portion can be swiveled on a vertical pivot or turned on a horizontal pivot.

A further object of the invention is to provide means by which a single wrench can be used for locking either of the two clamps.

In the accompanying drawings:

Figure 1 is a side view of our improved vise;

Fig. 2 is a sectional view, the jaws of the vise being shown by dotted lines;

Fig. 3 is a sectional plan view on the line 3—3, Fig. 1;

Fig. 4 is a side view of the vise;

Fig. 5 is a perspective view of the swivel coupling;

Fig. 6 is a perspective view of the tapered nut which holds the body portion of the vise to the coupling, and Fig. 7 is a detached perspective view of one of the clamp bolts, a nut and a sleeve.

Referring to the drawings, 1 is the base, which is secured to the bench in any suitable manner. This base has two projecting portions forming bearings 2 and mounted between these two portions is the swivel coupling 3. This coupling is made as clearly shown in Fig. 4, and is recessed at one end, as at 4, to receive the projecting portion 6 of the nut 5, shown in Fig. 7, so that the nut will turn with the swivel coupling when the parts are loose. The nut is tapered, as shown, and is adapted to a tapered recess in one of the bearings 2. A bolt 7 extends through openings in the swivel coupling and is threaded at each end. One of the threads is adapted to the threads of the nut 5 and the other thread is adapted to a nut 8, which bears against a sleeve 9 adapted to the other bearing 2 and acts as a trunnion for the swivel coupling. On tightening the nut 8, the nut 5 is drawn tightly into the tapered recess and the sleeve 9 is clamped against the opposite end of the swivel coupling, holding it rigidly in position.

In the upper end of the swivel coupling is a tapered opening 10 and mounted in this opening is a nut 11, Fig. 6, similar in design to the nut 5, and this nut has an elongated projecting portion 12 adapted to a recess 13 in the under side of the body portion 14, so that the nut will turn with the body portion. A screw bolt 15 extends through an opening in the bottom of the body portion and into the threaded opening in the nut, and this bolt has a head 16, which is turned by a wrench 17 so that, on turning the bolt, the body portion can be drawn onto the swivel coupling in order to lock the body portion against any horizontal swivel motion and when the bolt is turned in the opposite direction the body portion is relieved so as to allow the body portion to be turned on the swivel coupling.

We preferably make the head 16 of the bolt 15 and the nut 8 of the bolt 7 of the same size so that the same wrench can be used for both parts. The body portion is recessed at 18 to allow for the insertion of the wrench and also to allow it to have a limited movement when the bolt is turned. The wrench 17 has a flange 19 at its lower edge and the screw 20 extends through a threaded opening in the body portion and overlaps the flange so as to hold the wrench in position so that it cannot be accidentally removed, and by backing off the screw 20 the wrench can be detached and can be used on the nut 8.

Mounted on the body portion is the vise proper, which consists of two jaws 21 and 23. The jaw 21, in the present instance, is the movable jaw and has a base 22 mounted on the portion 24 of the body 14. Projections 25 and 26 on the portion 24 extend into the longitudinal slot in the base 22 and the jaw 23 has an extension 27 which is mounted between these two projections and is secured by a screw 28 so that, in the present instance, the jaw 23 is the fixed jaw and the jaw 21 is the movable jaw. At the rear of the base 2 of the jaw 21 is a projection 29 through which extends the adjusting screw 30, which is attached at one end to the fixed jaw 23 and has at the opposite end a bar 31 by which it can be turned. On turning the screw, the jaw 21 is moved from or toward the jaw 23.

It will be seen by the above construction that the jaws of the vise can be moved toward and from each other to clamp the work, and by turning the screw bolt 15 in one direction the body portion can be relieved sufficiently so that it can be swiveled on the swiveled coupling 3, and if it be necessary to tilt the vise in either direction by detaching the wrench 17 from the head 16 of the bolt and applying it to the nut 8, or applying another wrench, the swivel coupling can be released sufficiently from the base to allow it to be turned at any angle desired and clamped in position, making what is practically a universal vise.

The vise proper consists of two jaws which can be readily detached from the body portion by backing off the screw 28 and can be used as a clamp for drill presses and other tools.

We claim:

1. The combination in a vise, of a base having upwardly projecting bearings spaced apart; a swiveled coupling located between the bearings; a body portion carried by the swiveled coupling; means for holding the said body portion to said coupling; a bolt extending through the bearings on the base and through the swivel coupling, one of said bearings having a socket; a nut mounted in the socket and engaging the swivel coupling; a bolt extending through said nut; and a short sleeve extending through the opposite bearing and located between the bolt and the swivel coupling so that, when the nut is turned, the swivel coupling is clamped to the bearing.

2. The combination in a vise, of a base having bearings spaced apart; a swivel coupling mounted between the bearings; a transverse bolt extending through the bearings and through the swivel coupling; a nut on the bolt having a tapered periphery adapted to the tapered opening in one of the bearings and having a portion engaging the swivel coupling so that the two parts will turn together; a sleeve adapted to the opposite bearing and resting against the end of the swivel coupling; means for causing the nut and the sleeve to be drawn toward each other so as to clamp the coupling rigidly to the bearing; a body portion; and means for securing the body portion to the swivel coupling.

3. The combination in a vise, of a base having two bearings spaced apart; a swivel coupling mounted between the bearings and having a recess at one end, one of the bearings having a tapered opening therein; a tapered nut adapted to the opening, said nut having an extension projecting into the recess in the swivel bearing so that the nut and the swivel bearing are turned together; a transverse bolt extending through the bearing and through the swivel coupling and having a thread adapted to the thread in the nut; a nut at the opposite end of the bolt; and a sleeve mounted opposite the bearing and located between the swivel coupling and the nut; so that on turning the nut in one direction the swivel coupling will be clamped to the bearing and when turned in the opposite direction the coupling will be free to turn in the bearings; and a body portion carried by the swivel coupling.

4. The combination of a vise having bearings spaced apart; a swivel coupling mounted between the bearings; means for adjustably holding the coupling in position, the swiveled coupling having a tapered opening in its upper portion; a body portion seated on the swiveled coupling; a tapered nut mounted in the tapered opening in the swivel coupling, said nut engaging the body portion so that it will turn therewith; and a bolt extending through an opening in the body portion and engaging the nut so that, on turning the bolt in one direction, the nut will be drawn tightly into the tapered opening in the swivel coupling in order to lock the body portion to said coupling and, on reversing the movement, the body portion will be released so that it can be turned; and vise jaws mounted in the body portion.

5. The combination of a base having bearings spaced apart; a cylindrical swivel coupling mounted in the base between the bearings and recessed in its under side, one of the bearings having a tapered opening; a tapered nut adapted to the opening, said nut having an elongated projection, the coupling having a recess adapted to receive the projection so that the nut will turn with the coupling; a bolt extending through the bearings and through the coupling and having a thread adapted to the nut and having a thread at its opposite end with a second nut mounted on said thread; a sleeve extending through the bearing opposite to the one having the tapered opening and bearing against the coupling so that on turning the last mentioned nut the swivel coupling will be clamped or released from the base, the swivel coupling having a tapered opening at its upper end and a seat surrounding the opening; a body portion mounted on the seat; a tapered nut adapted to the tapered opening; a bolt extending through the opening in the body portion and into the threaded opening in the nut, said nut having an elongated projection extending into a recess in the body portion so that the nut will turn with the body portion; and a vise proper detachably secured to the body portion, the parts being so constructed that they can be swiveled horizontally on the coupling and the coupling can be swiveled laterally on the base.

In witness whereof we affix our signatures.

THOMAS J. FEGLEY.
GEORGE O. LEOPOLD.

Copies of this patent may be obtained for five cents each, by addressing the "Commissioner of Patents, Washington, D. C."